(12) United States Patent
Kaehne

(10) Patent No.: US 7,785,642 B2
(45) Date of Patent: Aug. 31, 2010

(54) MANUFACTURED MINERAL WATER COMPOSITION

(75) Inventor: Ian D. Kaehne, Belair (AU)

(73) Assignee: Belair Biotechnology Pty Ltd, Belair, South Australia (AU)

( * ) Notice: Subject to any disclaimer, the term of this patent is extended or adjusted under 35 U.S.C. 154(b) by 713 days.

(21) Appl. No.: 10/509,803

(22) PCT Filed: Apr. 9, 2003

(86) PCT No.: PCT/AU03/00438

§ 371 (c)(1),
(2), (4) Date: Sep. 30, 2004

(87) PCT Pub. No.: WO03/086110

PCT Pub. Date: Oct. 23, 2003

(65) Prior Publication Data

US 2005/0145114 A1 Jul. 7, 2005

(30) Foreign Application Priority Data

Apr. 9, 2002 (AU) .................................. PS 1833

(51) Int. Cl.
*A23L 1/29* (2006.01)
(52) U.S. Cl. .............................. 426/74; 426/66; 426/590
(58) Field of Classification Search .................. 426/74, 426/592, 590, 600, 72, 73, 658, 648
See application file for complete search history.

(56) References Cited

U.S. PATENT DOCUMENTS

| | | | |
|---|---|---|---|
| 4,325,975 A * | 4/1982 | Lindon et al. .................. | 426/66 |
| 4,540,584 A * | 9/1985 | Someya ........................ | 424/687 |
| 5,464,619 A | 11/1995 | Kuznicki | |
| 7,090,878 B2 * | 8/2006 | Mehansho et al. ............ | 426/66 |

FOREIGN PATENT DOCUMENTS

| | | |
|---|---|---|
| DE | 19700368 A1 | 7/1998 |
| JP | 2002192169 | 7/2002 |
| WO | 01/50889 A1 | 7/2001 |
| WO | 01/52672 A1 | 7/2001 |
| WO | 02/00043 A1 | 1/2002 |

OTHER PUBLICATIONS

Lau et al., "A survey on the composition of mineral water and identification of natural mineral water," Int'l J. of Food Sci. and Tech., (2002) vol. 37, pp. 309-317.

* cited by examiner

*Primary Examiner*—Helen F Pratt
(74) *Attorney, Agent, or Firm*—Henry D. Coleman; R. Neil Sudol; William J. Sapone

(57) ABSTRACT

The manufactured mineral water of this invention is made from biologically acceptable soluble salts of four different groups which may be made separately. Group A elements consist of calcium at a final concentration of between 25 and 82 mg/L and magnesium at a final concentration of between 6 and 18 mg/L. Group B elements consist of phosphorus at a final concentration of between 15 and 80 mg/L, potassium at a final concentration of between 50 and 180 mg/L, silicon at a final concentration of between 0.45 to 1.5 mg/L, sodium at a final concentration of between 3 and 30 mg/L, chlorine at a final concentration of between 3 and 28 mg/L. Group C elements consist of boron at a final concentration of between 0 and 60 µg/L, chromium at a final concentration of between 0 and 0.5 µg/L, cobalt at a final concentration of between 0 and 0.5 µg/L, copper at a final concentration of between 0 and 12 µg/L, iodine at a final concentration of between 0 and 6 µg/L, lithium at a final concentration of between 0 and 1.5 µg/L, manganese at a final concentration of between 0 and 1.5 µg/L, molybdenum at a final concentration of between 0 and 1.5 µg/L, nickel at a final concentration of between 0 and 0.5 µg/L, selenium at a final concentration of between 0 and 100 µg/L, tin at a final concentration of between 0 and 1.5 µg/L, vanadium at a final concentration of between 0 and 0.1 µg/L and zinc at a final concentration of between 0 and 100 µg/L. Group D consists of iron at a final concentration of between 0 and 20 µg/L. The pH is preferably adjusted to a final value of between 6.6 to 8.0 with a still water or a final value of between 2.5 to 8.0 for an aerated or carbonated water.

51 Claims, No Drawings

MANUFACTURED MINERAL WATER COMPOSITION

FIELD OF THE INVENTION

This invention relates to a manufactured mineral water with a balance of minerals that enhances taste.

BACKGROUND TO THE INVENTION

The senses, particularly taste, enable humans to finely discriminate between beverages containing minerals in their composition. Mineralized drinking waters may be classed as natural or manufactured. Natural mineral waters are drawn from sources such as springs, spas, streams, wells and bores. Some natural mineral waters are consumed from necessity as a source of drinking water. Other natural waters have achieved popularity and notoriety from their association with cultural traditions and reputed health benefits. Some natural mineral waters are thought by some to increase longevity or reduce cardiovascular disease. Recently commercial promotion has strongly driven their consumption.

The universal human perception of taste of natural mineral waters extends from the near tasteless sensation of near pure waters to waters with undesirable characteristics such as excessive acidity, high salinity, or repulsive metallic, earthy or sulphurous taste. The perception of taste of waters between these extremes will depend on composition. The taste of natural mineral waters may be produced by biologically acceptable minerals but also by biologically unacceptable minerals which could be present in excessive amounts. The earth chemistry at a natural water source may also eliminate or severely reduce the levels of ions which may contribute to the human perception of taste of mineralised water.

The human sensory and physiological responses which would lead to the recognition of a mineral water with universally recognised superiority of taste are independent from the geochemical reactions which form natural mineral waters.

Manufactured mineral waters may be compositions of only water and minerals. Such beverages usually mimic aspects of natural mineral waters and usually contain some of their commonly occurring mineral components. Many have relatively simple formulations and a poor taste sensation.

Manufactured mineral waters also may be a part of a more complex beverage containing mineral and non-mineral components. Natural mineral waters which have been augmented by chemical treatment (e.g. municipal waters, aerated waters) or by minerals and non-mineral compounds also may be classified as manufactured mineral waters.

Many manufactured beverages containing minerals are promoted as health drinks and supplements for general nutrition or as beverages for assisting in the maintenance of mineral, fluid and energy balance, such as sports drinks. Manufactured beverages for mixing with stimulants and for refreshments may also contain minerals.

Many manufactured mineral waters and mineralised beverages are somewhat unpalatable and do not have universal acceptability for taste. Manufacturers commonly mask the poor taste of the mineral component by adding sugars, acids and flavours. The total salt content of some beverages is such that when they are consumed in more than a modest amount, say 100 to 200 ml, the consumer feels bloated. Added sugars can exacerbate this reaction. Most people do not need to consume the large quantities of sugars in manufactured beverages because such beverages increase their risk of excessive weight gain.

Manufacturing does offer the opportunity to circumvent the natural processes which preclude natural mineral waters from meeting the human perception of a mineral water with superiority of taste, and also avoids seasonal or other variability associated with natural sources. Manufacturing mineral waters also avoids excessive undesirable minerals occurring in natural waters.

A number of patents related to beverages or other food compositions have been granted and include the following U.S. Pat. Nos. 4,540,584, 4,592,909, 4,983,409, 5,032,411, 5,114,723, 5,294,606, 5,397,786, 6,351,457, 4,322,407, 4,738,856, 5,034,138, 5,786,006, 5,824,353 and 5,830,523.

SUMMARY OF THE INVENTION

This invention arises from the formulation of manufactured mineral water that provides a complexity and superiority of taste. The development of the formulations resulted from the presumption that a superiority of perceived taste can only be achieved by a broad elemental composition. A method to discriminate between mineral waters by defining component parts of taste that are important in mineral waters was also devised which method has enabled directed adjustment of such broad elemental formulations to meet desired, including superior, profiles of taste.

The invention might be said to reside in a manufactured mineral water consisting of water with the following elemental composition present as biologically acceptable soluble salts:

group A; calcium at a final concentration of between 25 and 82 mg/L and magnesium at a final concentration of between 6 and 18 mg/L, group B; phosphorus at a final concentration of between 15 and 80mg/L, potassium at a final concentration of between 50 and 180 mg/L, silicon at a final concentration of between 0.45 to 1.5 mg/L, sodium at a final concentration of between 3 and 30 mg/L, chlorine at a final concentration of between 3 and 28 mg/L, group C; boron at a final concentration of between 0 and 60 µg/L, chromium at a final concentration of between 0 and 0.5 µg/L, cobalt at a final concentration of between 0 and 0.5 µg/L, copper at a final concentration of between 0 and 12 µg/L, iodine at a final concentration of between 0 and 6 µg/L, lithium at a final concentration of between 0 and 1.5 µg/L, manganese at a final concentration of between 0 and 1.5 µg/L, molybdenum at a final concentration of between 0 and 1.5 µg/L, nickel at a final concentration of between 0 and 0.5 µg/L, selenium at a final concentration of between 0 and 100 µg/L, tin at a final concentration of between 0 and 1.5 µg/L, vanadium at a final concentration of between 0 and 0.1 µg/L and zinc at a final concentration of between 0 and 100 µg/L, group D: Iron at a final concentration of between 0 and 20 µg/L, the pH of the final beverage preferably being adjusted to a final value of between 6.6 to 8.0 with a still water or between 2.5 to 8.0 with an aerated or carbonated water.

A preferred range of concentrations of the group A elements are as follows, calcium at a final concentration of between 44 and 74 mg/L and magnesium at a final concentration of between 10 and 16 mg/L. The most preferable final concentration of calcium is about 59 mg/L and the most preferable final concentration of magnesium is about 13 mg/L.

A preferred range of concentrations of the group B elements are as follows; phosphorus at a final concentration of between 20 and 65 mg/L, potassium at a final concentration of between 80 and 150 mg/L, silicon at a final concentration of between 0.55 to 1.0 mg/L, sodium at a final concentration of between 5 and 15 mg/L, chlorine at a final concentration of between 5 and 14 mg/L.

A most preferred concentration of each group B element is as follows; phosphorus at a final concentration of about 30 mg/L, potassium at a final concentration of about 120 mg/L, silicon at a final concentration of about 0.75 mg/L, sodium at a final concentration of about 8 mg/L, and chlorine at a final concentration of about 9 mg/L.

A preferred range of concentrations of the group C elements are as follows; boron at a final concentration of between 10 and 40 µg/L, chromium at a final concentration of between 0.05 and 0.2 µg/L, cobalt at a final concentration of between 0.05 and 0.2 µg/L, copper at a final concentration of between 2 and 9 µg/L, iodine at a final concentration of between 0.4 and 2.5 µg/L, lithium at a final concentration of between 0.1 and 1.0 µg/L, manganese at a final concentration of between 0.1 and 1.0 µg/L, molybdenum at a final concentration of between 0.1 and 1.0 µg/L, nickel at a final concentration of between 0.05 and 0.2 µg/L, selenium at a final concentration of between 10 and 70 µg/L, tin at a final concentration of between 0.1 and 1.0 µg/L, vanadium at a final concentration of between 0.01 and 0.07 µg/L and zinc at a final concentration of between 10 and 70 µg/L.

A most preferred concentration of each group C element is as follows; boron at a final concentration of about 19 µg/L, chromium at a final concentration of about 0.1 µg/L, cobalt at a final concentration of about 0.1 µg/L, copper at a final concentration of about 4.3 µg/L, iodine at a final concentration of about 1.3 µg/L, lithium at a final concentration of about 0.4 µg/L, manganese at a final concentration of about 0.4 µg/L, molybdenum at a final concentration of about 0.5 µg/L, nickel at a final concentration of about 0.1 µg/L, selenium at a final concentration of about 34 µg/L, tin at a final concentration of about 0.4 µg/L, vanadium at a final concentration of about 0.03 µg/L and zinc at a final concentration of about 26 µg/L.

A preferred range of the group D element is as follows: iron at a final concentration of between 2 and 12 µg/L, and most preferably present at a final concentration of about 5 µg/L.

Most preferably, elements of groups A, B, C and D are present in about their most preferable range. This results in a beverage with a superior taste sensation. An acceptable beverage results from concentrations within the broadest range of the levels provided for by this invention, however that is improved where preferred ranges are used. Some or all of the elements of groups C and D may be absent particularly where the concentrations of the group A and B elements are present in their preferred or most preferred ranges, with less disruptive impact on taste profiles than where the concentrations of the group A and B elements are still within the broadest ranges of this invention but outside of the preferred ranges.

Those elements from group C and D that are more preferred to be present are boron, copper, iodine, selenium, zinc and iron.

The choices of biologically acceptable salts for each of the elements are wide and might be any of those that are acceptable for human consumption at the levels indicated. Biologically acceptable salts refer to salts of the minerals concerned that have no adverse effects on ingestion or afterwards at the levels in the beverage, and these levels will vary for each element.

There are some quite strong preferences in the source of the elements that form part of the invention. These are provided as a soluble salt and are thus provided with other elements which other elements must not be in a form that provides imbalances to the final composition or interferes with the manufacturing process. Preferably elements are maintained in a form capable of impacting on taste, thus the salts in which the elements are provided should be intercompatible and not, for example, complexed into forms that are unavailable for taste perception. Also there should be no other components that provide for significant adverse taste or health effects.

Calcium is most preferably provided or partially provided in the form of calcium hydroxide $Ca(OH)_2$. This is initially provided as a suspension particularly where it is provided as a concentrate. The preferred adjustment for pH is by the addition of $CO_2$ (carbon dioxide), which addition then converts the calcium hydroxide to calcium bicarbonate which is soluble $Ca(OH)_2+2\ CO_2 -> Ca(HCO_3)_2$. Calcium hydroxide is preferably added as the primary or sole source of calcium. Other sources of calcium might also be used but these are not preferred and if used should be used as part only of the source of calcium. Thus some of the calcium might be added as $CaCl_2$ (calcium chloride) however this cannot be used as the sole source of calcium because the levels of calcium required would result an excess of chlorine. $CaI_2$ (calcium iodine) might be used as a partial source of calcium but not the sole source because otherwise an excess of iodine is provided. $CaSO_4$ (calcium sulphate) might be used as a partial source however not the sole source because an excess of sulphur would result in an adverse taste characteristic. $Ca(H_2PO_4)_2$ (monobasic calcium phosphate) might be used as a partial but not sole source, otherwise an excess of phosphorus would be provided, solubility issues arise and additionally an unacceptable risk of reaction with the preferred silicon source ($SiO_3^{2-}$) would result.

Magnesium is preferably provided or partially as $Mg(OH)_2$ (magnesium hydroxide) which as with the calcium counterpart above is insoluble but can be provided in suspension in concentrated form and is converted to $Mg(HCO_3)_2$ (magnesium bicarbonate) when the pH is adjusted by the addition of $CO_2$. Magnesium hydroxide is preferably added as the primary or sole source of magnesium. Other sources of magnesium might also be used but these are not preferred and may be used as part only of the source of magnesium. Thus $MgCl_2$ (magnesium chloride) might be added as a partial but not sole source because at the concentrations for providing the required level of magnesium chlorine would be provided in excess. $Mg(H_2PO_4)_2$ (monobasic magnesium phosphate) may also provide as a partial but not complete source of magnesium for reasons similar to why calcium cannot be provided solely in this form. $MgSeO_4$ (magnesium selenate) may be a partial but not sole source of magnesium because at the concentrations for providing the required level of magnesium selenium would be provided in excess. $MgSO_4$ (magnesium sulphate) may be a partial but not sole source of magnesium because at the required levels of magnesium an excess of sulphur, with its adverse taste characteristics, would result.

Phosphorus might be provided solely or partially in the form of $KH_2PO_4$ (monobasic potassium phosphate) or alternatively or additionally in part by $NaH_2PO_4$ (monobasic sodium phosphate), the latter compound could lead to excessive levels of sodium at the concentration required if it were the sole source of phosphorus. $K_2HPO_4$ (dibasic potassium phosphate) may also be a partial source of phosphorus but care must be taken with the levels of potassium provided and a difficulty may be found in the handling of the compound because it is hygroscopic.

Potassium can be provided solely or partially in the form of $KH_2PO_4$ (monobasic potassium phosphate) or $KHCO_3$ (potassium bicarbonate). KCl (potassium chloride) may be a partial but not sole source of potassium because at the concentrations for providing the required level of potassium chlorine would be provided in excess. KI (potassium iodide) may be a partial but not sole source of potassium because at the concentrations for providing the required level of potassium iodine would be provided in excess. $K_2MoO_4.5H_2O$ (potassium molybdate) may be used as a partial source of potassium, but the ease of use of this compound is complicated because it is a deliquescent powder and also excess molybdenum should be avoided. $K_2HPO_4$ (dibasic potassium phosphate) may also be a partial source of potassium however care must be taken with the levels of phosphorus provided and a difficulty may be found in the handling of the compound because it is hygroscopic. $K_2SeO_4$ (potassium selenate) may also be a partial source of potassium but its use is limited by the level of selenium that is acceptable. $K_2SO_4$ (potassium sulphate) might also be used as a partial source of potassium, the level being limited by the tolerated level of sulphur.

Silicon is preferably provided as $Na_2SiO_3.5H_2O$ (sodium metasilicate).

There are a number of potential sources of sodium including $NaHCO_3$ (sodium bicarbonate) $Na_2B_4O_7.10H_2O$ (sodium tetraborate), NaCl (sodium chloride), $Na_2MoO_4.2H_2O$ (sodium molybdate), $Na_2SeO_4.10H_2O$ (sodium selenate), $Na_2SeO_3$ (sodium selenite) $Na_2SiO_3.5H_2O$ (sodium silicate) and $Na_2SO_4$ or $Na_2SO_4.10H_2O$ (sodium sulphate). Sodium is commonly found in salts used for other elements central to the formulation of the present composition so that whilst some of the above compounds may be suitable to solely supply the sodium it is anticipated that two or more of these compounds will collectively provide the requisite level of sodium perhaps also in combination with other sources. In addition to the above, less preferable sources of sodium include $NaH_2PO_4.H_2O$ or $2H_2O$ (monobasic sodium phosphate) and $Na_2HPO_4.7H_2O$ (dibasic sodium phosphate).

There are also a large range of salts that might provide chlorine and these might include NaCl (sodium chloride), KCl (potassium chloride), $CaCl_2$ (calcium chloride) or $MgCl_2$ (magnesium chloride).

Boron is preferably provided in the form $Na_2B_4O_7.10H_2O$ (sodium tetraborate) but might be provided as $K_2B_4O_7.5H_2O$ (potassium tetraborate).

Chromium is preferably provided in the form $K[Cr(SO_6H_4)_2(H_2O)_2].6H_2O$ (chromium potassium sulphate) which thus also will contribute as a source of potassium.

Cobalt is preferably provided as either $CoK_2(SO_4)_2.6H_2O$ (cobaltous potassium sulphate) or $CoSO_4.7H_2O$ (cobalt sulphate).

Copper is preferably provided in the form of $CuSO_4.5H_2O$ (cupric sulphate) but might be provided as $CuSeO_4.5H_2O$ (cupric selenate).

Iodine is preferably provided as (KI) potassium iodide.

Lithium is preferably provided in the form $Li_2SO_4.H_2O$ (lithium sulphate) and this is preferably the sole source of lithium. Alternatively or additionally lithium might be added as LiCl (lithium chloride) but this compound is deliquescent and therefore must be handled accordingly. Lithium might be also added as $Li_2SeO_4.H_2O$ (lithium selenate).

Manganese is preferably added in the form of $MnSO_4.H_2O$ (manganous sulphate) but may be provided perhaps in part in the form of $MnCl_2.4H_2O$ (manganous chloride).

Molybdenum is preferably added in the form of $Na_2MoO_4.2H_2O$ (sodium molybdate) but may also be provided perhaps in part in the form of $K_2MoO_4.5H_2O$ (potassium molybdate) the latter is however deliquescent and therefore must be handled accordingly.

Nickel is preferably added in the form $NiSO_4.6H_2O$ (nickel sulphate) but may also be provided perhaps in part in the form $NiCl_2.6H_2O$ (nickel chloride) the latter is however deliquescent and therefore must be handled accordingly.

Selenium is preferably added in the form $Na_2SeO_4.10H_2O$ (sodium selenate), $K_2SeO_4$ (potassium selenate), $MgSeO_4$ (magnesium selenate) or $Na_2SeO_3$ (sodium selenite).

Tin is preferably added as $SnCl_2.2H_2O$ (stannous chloride).

Vanadium is preferably added in the form of $NH_4VO_3$ (ammonium vanadate).

Zinc is preferably added as $ZnSO_4.H_2O$ or $ZnSO_4.7H_2O$ (zinc sulphate). Iron is preferably added as $FeSO_4.7H_2O$ (ferrous sulphate). Less preferably $FeCl_2$ or $FeCl_2.2H_2O$ (ferrous chloride) might also be used; the former being hygroscopic and the latter being somewhat unstable.

It is found that the preferred compounds do not adversely complex or interfere chemically with other compounds among the components. Thus where adverse strong complexes are formed between the component minerals or where adverse reactions take place between the component parts there is a strong likelihood that the minerals may be present in a form that will not contribute to the taste profile and may produce undesirable taste characteristics.

The pH for a still water is preferably in the range 7.2 to 7.6. The pH range can be much wider where an aerated or carbonated water is provided. The effect of the carbon dioxide gas captured in the beverage and released on consumption has the effect of firstly changing the pH of the beverage and generally results in a beverage of much lower pH, additionally it is found that the sensitivity of taste perception of pH is considerably lessened perhaps by a specific anaesthetising effect that the contact of carbon dioxide has on the tongue. Whatever explanation might be offered, it has been found empirically that an acceptable pH range with an aerated water can be as low as pH 2.5.

The preferred method of adjusting the pH is by the addition of carbon dioxide however, especially where the manufactured water composition is used in conjunction with flavouring compounds, the adjustment might be made with the addition of organic acids, in particular citric acid or tartaric acids.

It has also been found that a method can be developed for analysing and describing a mineral water by rating the intensities of several individual taste components which collectively present a specific taste profile for the mineral water. The comparison of such taste profiles has assisted with developing formulations according to this invention.

Accordingly, preferably the beverage provides a satisfactory taste profile from ratings of all the taste components as follows: initial taste sensation, mouthfeel, palate balance, palate persistence, acidity/alkalinity, earthy component, saltiness and mineral sensation. However the beverage may also have three, two or one of these taste characteristics in a preferred taste range rather than a most preferred taste range and still have a superior taste profile.

The beverage may be made by separate addition of amounts of elements of group A followed by addition of carbon dioxide followed by addition of each remaining element. However it has been found that preparation of concentrated forms of elements of each of the groups A, B, C and D is a convenient method of preparation. Group D is most preferably freshly prepared, but concentrated preparations of groups A, B and C can be stored.

The invention might therefore also reside in separate concentrate preparations of group A, B, C and D elements such that between 1 and 10% of each preparation are added to water to make up the final beverage or alternatively between 0.1 and 20% of each preparation are added to water to make up the final beverage. Alternatively the invention might reside in a concentrated solution of elements of groups B and C combined, however, it is preferred to keep these separate to ensure that there is no adverse interaction of the salt forms of these elements at the elevated concentrations in these preparations. The invention might also include a kit including all four, or three of these concentrated solutions for use in making up the final beverage.

Alternatively the invention might reside in a method of making a beverage comprising the steps of separately making up preparations of elements of groups A, B, C and D, or C and D combined, mixing the solutions and adjusting the pH in the mixture to make up the final beverage. Most preferably the pH is adjusted after elements of group A have been added to at least approximately their final concentration.

The water used as a base is preferably very low in mineral content. It may be deionized such as by passage through an ion adsorbing resin or it may be distilled water. Deionization of water might be achieved by normal processes. This results in water with very low mineral content, however glass distilled water is also found to be quite adequate as a base water depending on the supply fed to the still and might be for the purposes of manufacturing the present invention be deemed to have no significant mineral content and therefore a standard formulation of the elements of groups A, B, C and D can be added.

Alternatively natural waters may be used, and the added elements adjusted to compensate for the elemental composition of the base water. It is to be noted however that the particular profile of the salts constituting the elemental composition of the base water should be analysed to ensure that those salts are compatible with those salts that are added to make up a formulation according to the present invention. Another difficulty with using natural waters is that their salt content can often vary from time to time and thus an analysis of this might be required on a batch by batch basis or if continuous manufacture is employed then from time to time. Accordingly it is preferred to start with a purified water with a standardised salts composition.

It will also be appreciated that the water source should not contain damaging elements such as for example Pb, Ba, Hg, Cd or Ag or other impurities or adverse contaminants such as sulphides, sulphites, esters, aromatics or industrial chemical residues. Addition of strong adverse flavour components might also be avoided thus, for example, it is desired to have not more than 100 mg/L of $SO_4^{2-}$ equivalent (i.e. 33 mg S/L) because greater levels can adversely affect taste characteristics.

The beverage may also have flavouring compounds or colouring compounds added. Generally it is anticipated that the beverage will be a still water but it might be desired to have the water aerated or carbonated.

One surprising aspect of preferred embodiments of the invention is that when used as a diluent the taste profile of complex beverages such as wines is not substantially compromised. Thus the invention also encompasses combinations of the manufactured mineral water with other beverages such as wines, including red and white table wines, spirits and liqueurs, beers, teas and juices, which might include fruit and vegetable juices. Alternatively the invention might contemplate the manufactured mineral water together with added sugars, plant extracts and food acids. These might be provided as pre-mixed beverage for sale for example in containers such as cans, bottles or cartons.

It is found that a somewhat higher concentration of the manufactured mineral water might be beneficial in the dilution of complex beverages. The invention might anticipate direct addition of concentrates of manufactured mineral waters of up to about 5 times without further addition of water, although less concentrated preparations are preferred, of 4 times, 3 times or 2 times. Most preferably the concentrations used are in the range of 1 to 2 times.

In beer manufacturing where a high alcohol beer is brewed and then diluted, the dilution process might include the separate addition to the high alcohol beer of water and then concentrated preparations of group A, group B, group C and group D elements either separately or in combination, particularly the combinations set forth above. The dilution is such that the effective addition of the manufactured mineral water is at concentrations ranging from about 0.8 strength to about 5 strength, or more preferably the strengths set out in the previous paragraph.

DETAILED DESCRIPTION OF THE INVENTION

EXAMPLE 1

Initial Formulations and Taste Components

Biologically acceptable forms of soluble salts of minerals commonly associated with nutritional intake, or considered of nutritional importance were individually tested for palatability, in concentration ranges that might be considered to reflect the ranges that they are present in foods or other nutritional intake. The level of intake of some of the minerals needed considerable adjustment until ingestion could be tolerated or comfortable by reason of taste sensation. We then set out to test combinations of these elements, most preferably, all on the premise that together they would constitute a beverage with a superior taste, but before so doing it was considered essential to set out and score individually taste components that had a strong influence on the taste of mineral waters.

The taste components set out in Table 1 were devised on the basis of the strongest impacts on taste made by preferred compounds contributing individual element. These were refined somewhat on tasting combinations of elements. Analysis of prospective formulations using these separate components provided a qualitative rating structure and a degree of analytical objectivity to the testing and also provided for a direction in adjustment of the formulation. Beverages were scored on the basis of the taste components set out in Table 1.

TABLE 1

Taste components for testing formulations of mineral water.
Rating of Taste Components

| Taste Components | Qualitative Rating Description |
|---|---|
| 1. | Initial sensation upon intake (0-2 seconds) none    weak    acceptable   too strong   repulsive |

TABLE 1-continued

Taste components for testing formulations of mineral water.
Rating of Taste Components

| Taste Components | Qualitative Rating Description | | | | |
|---|---|---|---|---|---|
| 2. | Mouthfeel sensation (2-15 Seconds) | | | | |
|  | none | weak | acceptable | too strong | repulsive |
| 3. | Palate balance characteristics (while tasting) | | | | |
|  | back only | predominantly back | balanced | predominantly front | front only |
| 4. | Palate persistence characteristics (after swallowing) | | | | |
|  | no persistence | dissipates quickly | acceptable | too extended | persistent |
| 5. | Acidity/Alkalinity | | | | |
|  | very acid/sour | acid | acceptable | too alkaline | soapy |
| 6. | "Earthy" (lime, calcic, magnesic) characteristics | | | | |
|  | absent | too weak | acceptable | too strong | excessive |
| 7. | 'Saltiness' sensation characteristics | | | | |
|  | absent | too weak | acceptable | too strong | very saline |
| 8. | 'Mineral' sensation characteristics | | | | |
|  | absent | too weak | acceptable | too strong | metallic |

EXAMPLE 2

Preparative Techniques

Preparation of Separate Group A, B, C and D Preparations

The group A elements are prepared separately by suspension in purified water (B.P. grade pure water (double distilled deionized filtered)) of calcium hydroxide $Ca(OH)_2$ and magnesium hydroxide $Mg(OH)_2$ in proportions of Ca:Mg required in the mineralized drinking water. The group A concentrate preparation takes the form of a suspension. Commercially available calcium hydroxide and magnesium hydroxide may contain insoluble carbonates. These are best removed by filtering the solution of group A after addition of $CO_2$ or by filtering the final solution.

The group B elements are prepared as a solution in purified water using the following salts:
Monobasic potassium phosphate ($KH_2PO_4$)
Potassium bicarbonate ($KHCO_3$)
Sodium metasilicate ($Na_2SiO_3.5H_2O$)
Sodium bicarbonate ($NaHCO_3$)
Sodium chlorine (NaCl)

The quantities of these salts are added so that the group B solution contains the elements phosphorus, potassium, silicon, sodium and chlorine in the proportions required in the mineralized drinking water. In the preparation of this solution some proportion of $KHCO_3$ and $NaHCO_3$ undergo the reactions $KHCO_3+KH_2PO_4->K_2HPO_4+H_2O+CO_2$ and $2NaHCO_3+2KH_2PO_4->Na_2HPO_4+K_2HPO_4+2H_2O+2CO_2$. The concentrated group B preparation takes, in part, the form of a stable colloid once the silicate is added.

The group C elements are prepared in a single solution in purified water using the following salts:

| | |
|---|---|
| Sodium tetraborate[1] | $Na_2B_4O_7•10H_2O$ |
| Chromium potassium sulphate[2,3] | $K[Cr(SO_6H_4)_2(H_2O)_2]•6H_2O$ |
| Cobalt Sulphate[3] | $CoSO_4•7H_2O$ |
| Cupric Sulphate[3] | $CuSO_4•5H_2O$ |
| Potassium Iodide[2] | KI |
| Lithium Sulphate[3] | $Li_2SO_4•H_2O$ |
| Manganous Sulphate[3] | $MnSO_4•H_2O$ |
| Sodium Molybdate[1] | $Na_2MoO_4•H_2O$ |

-continued

| | |
|---|---|
| Nickel Sulphate[3] | $NiSO_4•6H_2O$ |
| Sodium Selenate[1] | $Na_2SeO_4•10H_2O$ |
| Stannous Chloride[4] | $SnCl_2•H_2O$ |
| Ammonium Vanadate[5] | $NH_4VO_3$ |
| Zinc Sulphate[3] | $ZnSO_4•7H_2O$ |

Notes
[1] Sodium is added in (C) in addition to (B). This should be allowed for by either adjusting (B) or adjusting final sodium concentration to allow for sodium in (C). Note (C) adds μg levels as compared to mg levels in (B).
[2] Potassium is added in (C) in addition to (B). This should be allowed for by either adjusting (B) or adjusting final potassium concentration to allow for sodium in (C). Note (C) adds μg levels as compared to mg levels in (B).
[3] The final concentration of sulphate anion ($SO_4^{2-}$) is determined by the concentrations of $Cr^{++}$, $Co^{++}$, $Cu^{++}$, $Li^{++}$, $Mn^{++}$, $Ni^{++}$ and $Zn^{++}$ in the mineralized drinking water.
[4] Chloride is added in (C) in addition to (B). This should be allowed for by either adjusting (B) or adjusting final chloride concentration to allow for chloride in (C). Note (C) adds μg levels as compared to mg levels in (B).
[5] Only very small amounts of nitrogen are present as ammonium $NH_4^+$ cation.

The group A, B, and C preparations can be premade and stored separately.

The group D element is made up freshly as a solution in purified water as $FeSO_4.7H_2O$ (ferrous sulphate) which is prepared additionally and separately from C to avoid ferric cations, resulting from oxidation of ferrous cations ($Fe^{++}->Fe^{+++}$), contaminating solution C or deteriorating solution D. Ferrous sulphate may be added directly to base solution (C) for later use if oxidation can be prevented or it may be added immediately to make up the beverage. The ferrous sulphate is also preferably filtered prior to use to remove any insoluble ferric complexes that might be present in commercial sources. Please note: Note 3 above about ($SO_4^{2-}$) also applies.

Mixing of Component Parts

The proportions of (A), (B), (C) and (D) required in the mineralized drinking water are determined.

For Example. Prepare the concentration of elements in preparations A, B, C and D such that the final beverage water contains the following quantities of the initial solutions:

| | |
|---|---|
| (A) | 2% |
| (B) | 2% |
| (C) | 1% |

-continued

| | | |
|---|---|---|
| (D) | | 0.1% |
| Purified Water- | | 94.9% |
| | | 100.0% |

Add suspension A to purified water such that when solutions B, C and D are also added the total volume will contain calcium and magnesium at the final required concentration. The elements of group A are typically a suspension and therefore this should be adequately mixed to provide for a uniform amount of the two elements.

In the above example 20 parts of group A elements are added to 949 parts purified water to make 969 parts of a suspension of A. The addition of 20 parts of solution B, 10 of solution C and 1 of solution D will make a total of 1000 parts at the desired concentration.

Add $CO_2$ to suspension of solution A (in 969 parts) in sufficient amount so that the pH of the final prepared mineralized drinking water is at the preferred level which is pH of between 7.2 to 7.6.

$CO_2$ may be added by bubbling $CO_2$ from a cylinder of $CO_2$ into the diluted solution A, dissolving solid $CO_2$ (dry ice) in a pressure vessel containing diluted solution A, or injecting $CO_2$ into a pressure vessel which holds the dilute solution A.

When $CO_2$ has reacted with the suspension and a clear solution forms it is indicative that the calcium salt and magnesium salt have almost all been converted to $Ca(HCO_3)_2$ and $Mg(HCO_3)_2$ together with dissolved $CO_2$.

The required amount of $CO_2$ is to be determined by preparing test mixes and pH determination.

Following pH adjustment the required volume of solutions B, C and D can be added.

The resulting solution is clear and ready for consumption. The final beverage is stable and can be stored and refrigerated or frozen.

EXAMPLES 3-20

Formulations of Beverages Made as Above

The concentrations for elements in groups A and B are mg/L whereas for groups C and D they are µg/L.

TABLE 2(a)

Composition of exemplary formulations

| group/element | | EXAMPLES | | | | | | |
|---|---|---|---|---|---|---|---|---|
| | | 3 | 4 | 5 | 6 | 7 | 8 | 9 |
| A | Ca | 45 | 50 | 65 | 70 | 55 | 55 | 55 |
| | Mg | 15 | 12 | 10 | 10 | 15 | 15 | 15 |
| B | P | 20 | 30 | 40 | 50 | 40 | 40 | 40 |
| | K | 100 | 130 | 100 | 80 | 110 | 110 | 110 |
| | Si | 0.9 | 0.7 | 0.6 | 1.0 | 0.8 | 0.8 | 0.8 |
| | Na | 7 | 12 | 14 | 9 | 7 | 7 | 7 |
| | Cl | 6 | 12 | 9 | 14 | 6 | 6 | 6 |
| C | B | 15 | 35 | 20 | 25 | 25 | 0 | 0 |
| | Cr | 0.05 | 0.20 | 0.15 | 0.10 | 0 | 0.15 | 0 |
| | Co | 0.05 | 0.20 | 0.15 | 0.10 | 0 | 0.15 | 0 |
| | Cu | 3 | 8 | 4 | 6 | 6 | 0 | 0 |
| | I | 0.5 | 1.0 | 2.5 | 1.5 | 1.0 | 0 | 0 |
| | Li | 0.1 | 0.8 | 0.5 | 0.3 | 0 | 0.3 | 0 |
| | Mn | 0.1 | 0.8 | 0.5 | 0.3 | 0 | 0.3 | 0 |
| | Mo | 0.1 | 0.8 | 0.5 | 0.3 | 0 | 0.3 | 0 |
| | Ni | 0.05 | 0.2 | 0.15 | 0.10 | 0 | 0.1 | 0 |
| | Se | 12 | 65 | 40 | 25 | 50 | 0 | 0 |
| | Sn | 0.1 | 0.8 | 0.5 | 0.3 | 0 | 0.3 | 0 |
| | V | 0.01 | 0.06 | 0.03 | 0.05 | 0 | 0.05 | 0 |
| | Zn | 12 | 65 | 40 | 25 | 40 | 0 | 0 |
| D | Fe | 3 | 10 | 5 | 8 | 7 | 0 | 0 |

TABLE 2(b)

Composition of exemplary formulations

| group/element | | EXAMPLES | | | | | | |
|---|---|---|---|---|---|---|---|---|
| | | 10 | 11 | 12 | 13 | 14 | 15 | 16 |
| A | Ca | 55 | 55 | 55 | 55 | 20 | 90 | 55 |
| | Mg | 15 | 15 | 15 | 15 | 6 | 25 | 15 |
| B | P | 8 | 40 | 40 | 8 | 40 | 40 | 100 |
| | K | 110 | 40 | 110 | 40 | 110 | 110 | 110 |
| | Si | 0.8 | 0.8 | 0.8 | 0.2 | 0.8 | 0.8 | 2.5 |
| | Na | 7 | 7 | 2 | 2 | 7 | 7 | 7 |
| | Cl | 6 | 6 | 2 | 2 | 6 | 6 | 6 |
| C | B | 25 | 0 | 25 | 0 | 25 | 0 | 25 |
| | Cr | 0.15 | 0 | 0.15 | 0 | 0 | 0 | 0.15 |
| | Co | 0.15 | 0 | 0.15 | 0 | 0 | 0 | 0.15 |
| | Cu | 6 | 0 | 6 | 0 | 6 | 0 | 6 |
| | I | 1.0 | 0 | 1.0 | 0 | 1.0 | 0 | 1.0 |
| | Li | 0.3 | 0 | 0.3 | 0 | 0 | 0 | 0.3 |
| | Mn | 0.3 | 0 | 0.3 | 0 | 0 | 0 | 0.3 |
| | Mo | 0.3 | 0 | 0.3 | 0 | 0 | 0 | 0.3 |
| | Ni | 0.1 | 0 | 0.1 | 0 | 0 | 0 | 0.1 |
| | Se | 50 | 0 | 50 | 0 | 50 | 0 | 50 |
| | Sn | 0.3 | 0 | 0.3 | 0 | 0 | 0 | 0.3 |
| | V | 0.05 | 0 | 0.05 | 0 | 0 | 0 | 0.05 |
| | Zn | 40 | 0 | 40 | 0 | 40 | 0 | 40 |
| D | Fe | 7 | 0 | 7 | 0 | 7 | 0 | 7 |

TABLE 2(c)

Composition of exemplary formulations

| group/element | | EXAMPLES | | | | | |
|---|---|---|---|---|---|---|---|
| | | 17 | 18 | 19 | 20 | 21 | 22 |
| A | Ca | 55 | 55 | 55 | 55 | 50 | 55 |
| | Mg | 15 | 15 | 15 | 15 | 12 | 12 |
| B | p | 40 | 40 | 40 | 40 | 27 | 30 |
| | K | 110 | 150 | 110 | 110 | 135 | 120 |
| | Si | 0.8 | 2.5 | 0.8 | 0.8 | 0.7 | 0.8 |
| | Na | 25 | 7 | 7 | 7 | 8 | 8 |
| | Cl | 25 | 6 | 6 | 6 | 9 | 9 |
| C | B | 25 | 0 | 100 | 100 | 19 | 19 |
| | Cr | 0.15 | 0 | 0 | 1 | 0.1 | 0.1 |
| | Co | 0.5 | 0 | 0 | 1 | 0.1 | 0.1 |
| | Cu | 6 | 0 | 20 | 20 | 4 | 4 |
| | I | 1.0 | 0 | 10 | 10 | 1 | 1 |
| | Li | 0.3 | 0 | 0 | 3 | 0.4 | 0.4 |
| | Mn | 0.3 | 0 | 0 | 3 | 0.4 | 0.4 |
| | Mo | 0.3 | 0 | 0 | 2 | 0.5 | 0.5 |
| | Ni | 0.1 | 0 | 0 | 2 | 0.1 | 0.1 |
| | Se | 50 | 0 | 150 | 150 | 35 | 35 |
| | Sn | 0.3 | 0 | 0 | 2 | 0.4 | 0.4 |
| | V | 0.05 | 0 | 0 | 1 | 0.03 | 0.03 |
| | Zn | 40 | 0 | 120 | 120 | 25 | 25 |
| D | Fe | 7 | 0 | 25 | 25 | 5 | 5 |

It will be appreciated that some of the above formulations are not in accordance with the present invention.

Results

Most Preferred Mineral Concentrations

Solutions containing varying concentrations of simple salts and bicarbonates containing the elements in groups A and B and varying concentrations and combinations of the elements in groups C and D were tasted to determine the elemental concentrations which had a taste profile closest to acceptable for all taste components.

Each of the elements has a specific influence on taste and can be adjusted to alter the taste profile of the mineral water concerned.

Group A Minerals

Calcium and magnesium being both periodic group II elements generated a similar taste component with optimum concentrations of about 59 and 13 mg/L respectively Group B Minerals The optimal concentrations overall taste components for P, K, Si, Na and Cl were about 30, 120, 0.75, 8 and 9 mg/L respectively.

Groups C and D

Mixtures of varying proportions of solutions of salts of the elements B, Cu, I, Se, Zn and Fe produced optimum taste profile of elemental concentrations in the mixture of about 19, 4.3, 1.3, 34, 26 and 5 µg/L respectively.

When the remaining elements Cr, Co, Li, Mn, Mo, Ni, Sn and V were combined with the optimal solution of the above 6 elements it was found that they added complexity at an optimum of about 0.1, 0.1, 0.4, 0.4, 0.5, 0.1, 0.4 and 0.03 µg/L respectively.

Taste Profiles of Examples 3 to 22

Examples 3 to 22 were tested by a number of users against the taste components set out in table 1 to ascertain their taste profiles these are set out below.

TABLE 3(a)

Taste profiles of exemplified formulations

| Taste Components | 3 | 4 | 5 | 6 | 7 | 8 |
|---|---|---|---|---|---|---|
| 1 | weak | too strong | too strong | acceptable | weak | weak |
| 2 | weak | too strong | acceptable | acceptable | weak | weak |
| 3 | balanced | balanced | balanced | balanced | balanced | balanced |
| 4 | too extended | acceptable | acceptable | too extended | acceptable | no persistence |
| 5 | acceptable | acceptable | acceptable | acceptable | acceptable | acceptable |
| 6 | acceptable | acceptable | too strong | too strong | too weak | too weak |
| 7 | acceptable | acceptable | acceptable | acceptable | acceptable | acceptable |
| 8 | acceptable | acceptable | acceptable | acceptable | too weak | too weak |

TABLE 3(b)

Taste profiles of exemplified formulations

| Taste Characteristic | 9 | 10 | 11 | 12 | 13 | 14 |
|---|---|---|---|---|---|---|
| 1 | weak | acceptable | acceptable | weak | weak | too strong |
| 2 | weak | weak | acceptable | weak | week | acceptable |
| 3 | balanced | balanced | predominantly front | predominantly back | acceptable | predominantly front |
| 4 | dissipates quickly | dissipates quickly | dissipates quickly | dissipates quickly | dissipates quickly | dissipates quickly |
| 5 | acceptable | acceptable | acceptable | acceptable | acceptable | acceptable |
| 6 | too weak | too strong | too weak | acceptable | too weak | too weak |
| 7 | too weak | too weak | saline | too weak | too weak | acceptable |
| 8 | too weak | acceptable | absent | too weak | absent | acceptable |

TABLE 3(c)

Taste profiles of exemplified formulations

| Taste Component | 15 | 16 | 17 | 18 | 19 | 20 |
|---|---|---|---|---|---|---|
| 1 | repulsive | too strong | too strong | too strong | too strong | too strong |
| 2 | repulsive | too strong | too strong | too strong | too strong | too strong |
| 3 | predominantly front | predominantly back | acceptable | back only | predominantly front | front only |
| 4 | too extended | persistent | persistent | persistent | acceptable | acceptable |
| 5 | acceptable | acceptable | acceptable | acceptable | acceptable | acceptable |
| 6 | very excessive | too strong | too weak | too strong | too weak | too weak |

TABLE 3(c)-continued

| | | Taste profiles of exemplified formulations | | | | |
|---|---|---|---|---|---|---|
| 7 | saline | saline | saline | saline | acceptable | acceptable |
| 8 | metallic | metallic | too weak | metallic | metallic | metallic |

| Taste | Examples | |
|---|---|---|
| Characteristic | 21 | 22 |
| 1 | acceptable | acceptable |
| 2 | acceptable | acceptable |
| 3 | acceptable | acceptable |
| 4 | acceptable | acceptable |
| 5 | acceptable | acceptable |
| 6 | acceptable | acceptable |
| 7 | acceptable | acceptable |
| 8 | acceptable | acceptable |

Example 3 is generally low in elements of group B except for higher level of silicon and also has lower levels of group C and D minerals. Slightly weaker neutral and mouthfeel sensation and slightly lengthened palate. This is generally acceptable.

Example 4 has higher levels of sodium and chloride with group C and D minerals within the preferred range. Slightly intensified neutral and mouthfeel sensation. This example is a generally acceptable water.

Example 5 has slightly higher calcium, magnesium and sodium levels and the water has a slight intensity of earthiness and extends the palate. This example is a generally acceptable water.

Example 7 is less acceptable because of the deletion of some minor minerals has an overall weakening effect on the taste profile. This might not have been expected because of the small amounts of minerals concerned. Example 8 is also less acceptable. There is a more pronounced effect from the deletion of six of the group C minerals when compared to example 7. Example 9 is also less acceptable. The complete absence of group C and D minerals compromises the taste profile.

Example 10 has a low phosphorus level in group B minerals and is unacceptable. Example 11 has low potassium levels and an absence of group C and D minerals and is unacceptable. Example 12 has reduced sodium and chloride and is unacceptable. Example 13 has reduced group B minerals and an absence of C and D minerals and is unacceptable.

Example 15 has high levels of group A elements and deletion of group C and D elements and is almost repulsive. Example 16 has high phosphorus and silicon levels and is almost repulsive.

Example 17, has high sodium and chlorine and is repulsively saline, Example 18 has high potassium and silicon and absence of C and D group minerals and is repulsively heavy. Example 19 is high for some group C and D minerals and is repulsively metallic. Example 20 is high in C and D group minerals and is repulsively unstructured.

Example 21 is a very acceptable water. Example 22 has a slightly stronger taste profile than Example 21.

Discussion

A preferred drinking water must be acceptable for all taste components, and additionally must not have elements that are present at levels that allows for adverse health effects. Preferably the levels are such that there are benefits in the provision of minerals for long term health.

Generally pure water is tasteless however this does not provide a satisfying taste sensation. The factors that contribute to the taste sensation in the present invention are 1) elemental composition, 2) concentration of each element. 3) overall concentration of all elements and 4) the pH. These four factors interact to change the taste sensation which can be described using the eight separately discernible components of taste set out in Table 1.

Set out in Table 4 is a summary of the findings by the inventor of the influence that levels of some of the elements have on each of the eight taste characteristics that are set out in Table 1.

TABLE 4

Thresholds at which various elements induce sensation further from acceptable than the designated rating for each component.

| Taste component | Rating | Group A[1] (mg/L) Mg + Ca | Group B (mg/L) P | (mg/L) K | Si | Na | Cl | Group C + D[2] (total) µg/L |
|---|---|---|---|---|---|---|---|---|
| Initial sensation | too strong | >150 | >100 | >180 | — | >10 | >12 | >300 |
| | weak | <30 | <25 | <50 | <0.4 | <5 | <5 | <70 |
| Mouthfeel sensation | too strong | >150 | <80 | >150 | >5 | >20 | >20 | >300 |
| | weak | <40 | <15 | <50 | <0.4 | — | — | <70 |
| Palate balance | predominantly front | >200 | — | — | — | — | — | >300 |
| | predominantly back | <60 | — | — | >1.5 | >25 | >14 | — |

TABLE 4-continued

Thresholds at which various elements induce sensation further from acceptable than the designated rating for each component.

| Taste component | Rating | Group A[1] (mg/L) Mg + Ca | Group B P | (mg/L) K | Si | Na | Cl | Group C + D[2] (total) µg/L |
|---|---|---|---|---|---|---|---|---|
| Palate persistence | too extended | >100 | — | — | >1.5 | >20 | >20 | >250 |
|  | dissipates quickly | — | — | — | — | — | — | — |
| Acidity/Alkalinity | too acidic | <30 | — | — | — | — | — | — |
|  | too alkaline | >200 | — | — | — | — | — | — |
| Earthy | too strong | >100 | — | — | >2.0 | — | — | — |
| Characteristic | too weak | — | — | >150 | <0.5 | >20 | >20 | >250 |
| Saltiness | too strong | >150 | — | >150 | >1.5 | >20 | >20 | — |
| sensation | too weak | — | — | — | — | <1 | <1 | — |
| Mineral | too strong | >100 | — | — | >3.0 | — | — | >300 |
| sensation | too weak | — | — | — | — | >20 | >20 | — |

(—) indicates no clear threshold is applicable or defined
[1] The ratio of calcium to magnesium taste was that of the most preferred composition.
[2] The proportion of the elements of groups C and D used was that of the most preferred composition.

This then gives a capacity to adjust certain of the taste components of a given taste profile of a manufactured mineral water formulation.

EXAMPLE 21 pH and Concentration

A formulation was made up using essentially the method set out above for example 21. The pH was adjusted incremental at 0.1 pH units to test the impact on the taste profile. It was found that an optimum profile was exhibited in the range of 7.2 to 7.6 with an acceptable taste present at between pH 6.6 through to pH 8.0. At lower pH levels the acidity became strongly evident. At higher pH levels the taste profile became strongly earthy.

EXAMPLE 23

Manufacture of Low Alcohol Beer

In the manufacture of low alcohol beer it is common to brew beer of a higher alcoholic content and stronger flavour characteristics and then to dilute this to the desired alcohol content. Such dilution might be quite extensive and whilst most alcohol contents can be achieved the difficulty resides in achieving an acceptable taste profile.

The present invention has application to this process because of the finding that the manufactured mineral water of this invention maintains the taste profile of complex beverages.

Experiments have been conducted with the formulation as in example 21. The basic proportion of elements was maintained the same except the concentrations of this formulation were varied. A commercial beer sold under the brand name "James Squires" at 5% alcohol content beer produced by Lion Nathan Australia Pty Ltd was used. It was found that 80% through to 140% strength gave an acceptable taste where the beer was dilute in proportion 85:15 of manufactured mineral water but that concentration of greater than 180% strength gave a near equivalent taste. With greater dilutions the benefits of a higher concentration of manufactured mineral water was enhanced. An acceptable taste was achieved with dilutions of as high as 50:50 with an 180% strength, although it is anticipated that even higher dilutions can achieve an acceptable taste and in particular with higher concentrations of the manufactured mineral water, perhaps as high as about 20:80, 30:70 or 40:60.

Similar findings were made when other complex beverages were diluted. Thus higher concentrations of the manufactured mineral water were found to enhance maintenance of the taste for a red wine, a bourbon whisky, an orange juice, a vegetable juice mixture, and a manufactured energy drink sold under the brand name "Gatorade".

Various features of the invention have been particularly described in connection with the exemplified embodiment of the invention, however, it must be understood that these particular arrangements merely illustrate and that the invention is not limited thereto and can include various modifications falling within the spirit and scope of the invention.

The invention claimed is:

1. A manufactured mineral water with the following elemental composition present as biologically acceptable soluble salts:

group A consisting of calcium at a final concentration of between 25 and 82 mg/L and magnesium at a final concentration of between 6 and 18 mg/L, group B consisting of phosphorus at a final concentration of between 15 and 80 mg/L, potassium at a final concentration of between 50 and 180 mg/L, silicon at a final concentration of between 0.45 to 1.5 mg/L, sodium at a final concentration of between 3 and 30 mg/L, chlorine at a final concentration of between 3 and 28 mg/L, group C consisting of boron at a final concentration of between 0 and 60 µg/L, chromium at a final concentration of between 0 and 0.5 µg/L, cobalt at a final concentration of between 0 and 0.5 µg/L, copper at a final concentration of between 0 and 12 µg/L, iodine at a final concentration of between 0 and 6 µg/L, lithium at a final concentration of between 0 and 1.5 µg/L, manganese at a final concentration of between 0 and 1.5 µg/L, molybdenum at a final concentration of between 0 and 1.5 µg/L, nickel at a final concentration of between 0 and 0.5 µg/L, selenium at a final concentration of between 0 and 100 µg/L, tin at a final concentration of between 0 and 1.5 µg/L, vanadium at a final concentration of between 0 and 0.1 µg/L and zinc at a final concentration of between 0 and 100 µg/L, and group D consisting of iron at a final concentration of between 0 and 20 µg/L, substantially free of a flavor or sweetener compound.

2. The manufactured mineral water as in claim 1 wherein the pH of the final beverage is adjusted to a final value of between 6.6 to 8.0 for a still water or a final value of between 2.5 to 8.0 for an aerated or carbonated water.

3. Concentrated preparations of minerals for making the manufactured mineral water of claim 1 including concentrated preparations of group A elements and concentrated preparations of group B elements such that between 0.1 and 20% of each preparation are added to water to make up the final mineral water.

4. Concentrated preparations of minerals as in claim 3 additionally including a concentrated preparation of group C elements such that between 0.1 and 20% of each preparation are added to water to make up the final mineral water.

5. A method of diluting a beverage, the method including the step of adding to the beverage a manufactured mineral water of claim 1 or a mineral water concentrate having the elements of the manufactured mineral water at up to five times the concentrations set out in claim 1, to the beverage, at a level to achieve an acceptable taste.

6. The method of diluting a beverage as in claim 5 wherein the mineral water concentrate is added and wherein the elements are present up to 2.5 times the concentration.

7. The method of diluting a beverage as in claim 5 wherein the beverage is beer.

8. A method of diluting a beverage, the method including the step of preparing a concentrated preparations of the minerals for making the manufactured mineral water of claim 1, including a concentrated preparation of group A elements, a concentrated preparation of group B elements, a concentrated preparation of group C elements and a concentrated preparation of the group D element, the concentration being such that between 0.1 and 20% of each preparation may be added to water to make up the final mineral water, the method additionally including the step of adding water and the concentrated preparations in amounts so that together they make up a manufactured mineral water concentrate having the elements of the manufactured mineral water at up to five times the concentrations set out in claim 1.

9. The method of diluting a beverage as in claim 8 wherein the concentrate and water is added in amounts so that together they make up a manufactured mineral water concentrate having the elements of the manufactured mineral water at up to 2.5 times the concentrations set out in claim 1.

10. The method of diluting a beverage as in claim 8 wherein the beverage is selected from the group consisting of wines, spirits and liqueurs, beers, teas and juices.

11. The method of diluting a beverage as in claim 9 wherein the beverage is beer.

12. The manufactured mineral water as in claim 2 wherein the range of concentrations of the group A elements are as follows, calcium at a final concentration of between 44 and 74 mg/L and magnesium at a final concentration of between 10 and 16 mg/L.

13. The manufactured mineral water as in claim 2 wherein the final concentration of calcium is about 59 mg/L and the final concentration of magnesium is about 13 mg/L.

14. The manufactured mineral water as in claim 2 wherein the concentration of the group B elements is as follows; phosphorus at a final concentration of about 30 mg/L, potassium at a final concentration of about 120 mg/L, silicon at a final concentration of about 0.75 mg/L, sodium at a final concentration of about 8 mg/L, and chlorine at a final concentration of about 9 mg/L.

15. The manufactured mineral water as in claim 2 wherein the concentration of the group C elements are as follows; boron at a final concentration of between 10 and 40 µg/L, chromium at a final concentration of between 0.05 and 0.2 µg/L, cobalt at a final concentration of between 0.05 and 0.2 µg/L, copper at a final concentration of between 2 and 9 µg/L, iodine at a final concentration of between 0.4 and 2.5 µg/L, lithium at a final concentration of between 0.1 and 1.0 µg/L, manganese at a final concentration of between 0.1 and 1.0 µg/L, molybdenum at a final concentration of between 0.1 and 1.0 µg/L, nickel at a final concentration of between 0.05 and 0.2 µg/L, selenium at a final concentration of between 10 and 70 µg/L, tin at a final concentration of between 0.1 and 1.0 µg/L, vanadium at a final concentration of between 0.01 and 0.07 µg/L and zinc at a final concentration of between 10 and 70 µg/L.

16. The manufactured mineral water as in claim 2 where the concentration of each group C element is as follows; boron at a final concentration of about 19 µg/L, chromium at a final concentration of about 0.1 µg/L, cobalt at a final concentration of about 0.1 µg/L, copper at a final concentration of about 4.3 µg/L, iodine at a final concentration of about 1.3 µg/L, lithium at a final concentration of about 0.4 µg/L, manganese at a final concentration of about 0.4 µg/L, molybdenum at a final concentration of about 0.5 µg/L, nickel at a final concentration of about 0.1 µg/L, selenium at a final concentration of about 34 µg/L, tin at a final concentration of about 0.4 µg/L, vanadium at a final concentration of about 0.03 µg/L and zinc at a final concentration of about 26 µg/L.

17. The manufactured mineral water as in claim 2 wherein the concentration of the group D element is as follows; iron is at a final concentration of between 2 and 12 µg/L.

18. The manufactured mineral water as in claim 2 wherein iron is present at a final concentration of about 5 µg/L.

19. The manufactured mineral water as in claim 2 wherein calcium is at a final concentration of about 59 mg/L, magnesium is at a final concentration of about 13 mg/L, phosphorus is at a final concentration of about 30 mg/L, potassium is at a final concentration of about 120 mg/L, silicon is at a final concentration of about 0.75 mg/L, sodium is at a final concentration of about 8 mg/L, chlorine is at a final concentration of about 9 mg/L, boron is at a final concentration of about 19 µg/L, chromium is at a final concentration of about 0.1 µg/L, cobalt is at a final concentration of about 0.1 µg/L, copper is at a final concentration of about 4.3 µg/L, iodine is at a final concentration of about 1.3 µg/L, lithium is at a final concentration of about 0.4 µg/L, manganese is at a final concentration of about 0.4 µg/L, molybdenum is at a final concentration of about 0.5 µg/L, nickel is at a final concentration of about 0.1 µg/L, selenium is at a final concentration of about 34 µg/L, tin is at a final concentration of about 0.4 µg/L, vanadium is at a final concentration of about 0.03 µg/L; zinc is at a final concentration of about 26 µg/L; and iron is at a final concentration of about 5 µg/L.

20. The manufactured mineral water as in claim 2 wherein calcium is at a final concentration of about 59 mg/L, magnesium is at a final concentration of about 13 mg/L, phosphorus is at a final concentration of about 30 mg/L, potassium is at a final concentration of about 120 mg/L, silicon is at a final concentration of about 0.75 mg/L, sodium is at a final concentration of about 8 mg/L and chlorine is at a final concentration of about 9 mg/L and wherein the some or all of the elements of group C and D are absent.

21. The manufactured mineral water as in claim 20 wherein boron, copper, iodine, selenium, zinc and iron are present.

22. The manufactured mineral water as in claim 2 wherein calcium is provided in the form of calcium hydroxide Ca(OH)$_2$.

23. The manufactured mineral water as in claim 2 wherein calcium is provided in the form of one or more of but not wholly of one of the group consisting of CaCl$_2$ (calcium, chloride) CaI$_2$(calcium iodine) CaSO$_4$ (calcium sulphate) Ca(H$_2$PO$_4$)$_2$ (monobasic calcium phosphate) and calcium hydroxide Ca(OH)$_2$.

24. The manufactured mineral water as in claim 2 wherein magnesium is provided in the form of Mg(OH)$_2$ (magnesium hydroxide).

25. The manufactured mineral water as in claim 2 wherein magnesium is provided in the form of one or more of but not wholly of one of the group consisting of MgCl$_2$ (magnesium chloride), Mg(H$_2$PO$_4$)$_2$ (monobasic magnesium phosphate), MgSeO$_4$ (magnesium selenate), MgSO$_4$ (magnesium sulphate) and Mg(OH)$_2$ (magnesium hydroxide).

26. The manufactured mineral water as in claim 2 wherein phosphorous is provided in the form of KH$_2$PO$_4$ (monobasic potassium phosphate).

27. The manufactured mineral water as in claim 2 wherein phosphorous is provided in the form of one or more of but not wholly of one of the group consisting of KH$_2$PO$_4$ (monobasic potassium phosphate), NaH$_2$PO$_4$ (monobasic sodium phosphate) and K$_2$HPO$_4$ (dibasic potassium phosphate).

28. The manufactured mineral water as in claim 2 wherein potassium is provided in a form selected from the group consisting of KH$_2$PO$_4$ (monobasic potassium phosphate) and KHCO$_3$ (potassium bicarbonate).

29. The manufactured mineral water as in claim 2 wherein potassium is provided in the form of one or more of but not wholly of one of the group consisting of KH$_2$PO$_4$ (monobasic potassium phosphate), KHCO$_3$ (potassium bicarbonate), KCl (potassium chloride), KI (potassium iodide), K$_2$MoO$_4$.5H$_2$O (potassium molybdate), K$_2$HPO$_4$ (dibasic potassium phosphate), K$_2$SeO$_4$ (potassium selenate) and K$_2$SO$_4$ (potassium sulphate).

30. The manufactured mineral water as in claim 2 wherein silicon is provided in the form of Na$_2$SiO$_3$.5H$_2$O (sodium metasilicate).

31. The manufactured mineral water as in claim 2 wherein sodium is provided wholly or partially in a form selected from the group consisting of NaHCO$_3$ (sodium bicarbonate) Na$_2$B$_4$O$_7$.10H$_2$O (sodium tetraborate), NaCl (sodium chloride), Na$_2$MoO$_4$.2H$_2$O (sodium molybdate), Na$_2$SeO$_4$.10H$_2$O (sodium selenate), Na$_2$SeO$_3$ (sodium selenite) Na$_2$SiO$_3$.5H$_2$O (sodium silicate) and Na$_2$SO$_4$ and Na$_2$SO$_4$.10H$_2$O (sodium sulphate).

32. The manufactured mineral water as in claim 2 wherein sodium is provided in the form of one or more of but not wholly of one of the group consisting of NaHCO$_3$ (sodium bicarbonate) Na$_2$B$_4$O$_7$.10H$_2$O (sodium tetraborate), NaCl (sodium chloride), Na$_2$MoO$_4$.2H$_2$O (sodium molybdate), Na$_2$SeO$_4$.10H$_2$O (sodium selenate), Na$_2$SeO$_3$ (sodium selenite) Na$_2$SiO$_3$.5H$_2$O (sodium silicate) and Na$_2$SO$_4$ and Na$_2$SO$_4$.10H$_2$O (sodium sulphate), NaH$_2$PO$_4$.H$_2$O or 2H$_2$O (monobasic sodium phosphate) and Na$_2$HPO$_4$.7H$_2$O (dibasic sodium phosphate).

33. The manufactured mineral water as in claim 2 wherein chlorine is provided wholly or partially in a form selected from the group consisting of NaCl (sodium chloride), KCl (potassium chloride), CaCl$_2$ (calcium chloride) and MgCl$_2$ (magnesium chloride).

34. The manufactured mineral water as in claim 2 wherein boron is provided wholly or partially in a form selected from one of the group consisting of Na$_2$B$_4$O$_7$.10H$_2$O (sodium tetraborate) but might be provided as K$_2$B$_4$O$_7$.5H$_2$O (potassium tetraborate).

35. The manufactured mineral water as in claim 2 wherein chromium is provided in the form K[Cr(SO$_6$H$_4$)$_2$(H$_2$O)$_2$].6H$_2$O (chromium potassium sulphate).

36. The manufactured mineral water as in claim 2 wherein cobalt is provided wholly or partially in a form selected from one or more of the group consisting of CoK$_2$(SO$_4$)$_2$.6H$_2$O (cobaltous potassium sulphate) and CoSO$_4$.7H$_2$O (cobalt sulphate).

37. The manufactured mineral water as in claim 2 wherein copper is provided wholly or partially in a form selected from one or more of the group consisting of CuSO$_4$.5H$_2$O (cupric sulphate) and CuSeO$_4$.5H$_2$O (cupric selenate).

38. The manufactured mineral water as in claim 2 wherein iodine is provided as (KI) potassium iodide.

39. The manufactured mineral water as in claim 2 wherein lithium is provided as Li$_2$SO$_4$.H$_2$O (lithium sulphate).

40. The manufactured mineral water as in claim 2 wherein lithium is provided wholly or partially in a form selected from one or more of the group consisting of Li$_2$SO$_4$.H$_2$O (lithium sulphate), LiCl (lithium chloride) or Li$_2$SeO$_4$.H$_2$O (lithium selenate).

41. The manufactured mineral water as in claim 2 wherein manganese is provided wholly or partially in a form selected from one or more of the group consisting of MnSO$_4$.H$_2$O (manganous sulphate) MnCl$_2$.4H$_2$O (manganous chloride).

42. The manufactured mineral water as in claim 2 wherein molybdenum is provided in the form of Na$_2$MoO$_4$.2H$_2$O (sodium molybdate).

43. The manufactured mineral water as in claim 2 wherein nickel is provided in the form of NiSO$_4$.6H$_2$O (nickel sulphate).

44. The manufactured mineral water as in claim 2 wherein selenium is provided wholly or partially in a form selected from one or more of the group consisting of Na$_2$SeO$_4$.10H$_2$O (sodium selenate), K$_2$SeO$_4$ (potassium selenate), MgSeO$_4$ (magnesium selenate) and Na$_2$SeO$_3$ (sodium selenite).

45. The manufactured mineral water as in claim 2 wherein tin is provided in the form of Tin SnCl$_2$.2H$_2$O (stannous chloride).

46. The manufactured mineral water as in claim 2 wherein vanadium is provided in the form of NH$_4$VO$_3$ (ammonium vanadate).

47. The manufactured mineral water as in claim 2 wherein zinc is provided wholly or partially in a form selected from one or more of the group consisting of ZnSO$_4$.H$_2$O and ZnSO$_4$.7H$_2$O (zinc sulphate).

48. The manufactured mineral water as in claim 2 wherein iron is provided in the form of FeSO$_4$.7H$_2$O (ferrous sulphate).

49. The manufactured mineral water as in claim 2 wherein the water is a still water and the pH for a still water is preferably in the range 7.2 to 7.6.

50. The manufactured mineral water as in claim 2 wherein the pH has been adjusted by the addition of carbon dioxide.

51. The manufactured mineral water as in claim 2 wherein the concentration of the group B elements are as follows; phosphorus at a final concentration of between 20 and 65 mg/L, potassium at a final concentration of between 80 and 150 mg/L, silicon at a final concentration of between 0.55 to 1.0 mg/L, sodium at a final concentration of between 5 and 15 mg/L, chlorine at a final concentration of between 5 and 14 mg/L.

* * * * *